(12) United States Patent
Parkinson et al.

(10) Patent No.: US 9,913,302 B2
(45) Date of Patent: Mar. 6, 2018

(54) SMART BLUETOOTH HEADSET FOR SPEECH COMMAND

(71) Applicant: Kopin Corporation, Westborough, MA (US)

(72) Inventors: Christopher Parkinson, Richland, WA (US); Dashen Fan, Bellevue, WA (US); Frederick Herrmann, Sharon, MA (US); John Gassel, Southborough, MA (US); Murshed Khandaker, Sharon, MA (US)

(73) Assignee: Kopin Corporation, Westborough, MA (US)

( * ) Notice: Subject to any disclaimer, the term of this patent is extended or adjusted under 35 U.S.C. 154(b) by 125 days.

(21) Appl. No.: 14/612,832

(22) Filed: Feb. 3, 2015

(65) Prior Publication Data

US 2015/0223272 A1    Aug. 6, 2015

Related U.S. Application Data

(60) Provisional application No. 61/935,141, filed on Feb. 3, 2014.

(51) Int. Cl.
*H04B 7/00* (2006.01)
*H04W 76/02* (2009.01)
(Continued)

(52) U.S. Cl.
CPC .......... *H04W 76/02* (2013.01); *G10L 19/005* (2013.01); *G10L 19/0017* (2013.01); *H04L 65/602* (2013.01); *H04M 1/6066* (2013.01); *H04M 2250/74* (2013.01)

(58) Field of Classification Search
None
See application file for complete search history.

(56) References Cited

U.S. PATENT DOCUMENTS 6,714,233 B2 *    3/2004    Chihara ................. H04B 1/385
                                              348/14.01
7,844,224 B2 *   11/2010    Tian ........................ G06F 3/165
                                              455/41.2
(Continued)

FOREIGN PATENT DOCUMENTS

EP          2 043 336         4/2009
WO     WO 2015/117138         8/2015

OTHER PUBLICATIONS

International Search Report and Written Opinion for PCT/US2015/014280 dated Apr. 22, 2014 entitled "Smart Bluetooth Headset for Speech Command".
(Continued)

*Primary Examiner* — Tuan A Tran
(74) *Attorney, Agent, or Firm* — Hamilton, Brook, Smith & Reynolds, P.C.

(57) ABSTRACT

A method of interfacing with a serving device from a wearable device worn by a user, the method includes establishing a lossless and wireless data link between the serving device and the wearable device. The method further includes collecting, by the wearable device, audio data from one or more microphones of the wearable device. The method also includes sending, by the wearable device, the collected audio data to the serving device through the lossless and wireless data link. The method may further include providing, by the serving device, speech recognition services associated with the audio data.

19 Claims, 3 Drawing Sheets

(51) Int. Cl.
*G10L 19/00* (2013.01)
*G10L 19/005* (2013.01)
*H04L 29/06* (2006.01)
*H04M 1/60* (2006.01)

(56) References Cited

U.S. PATENT DOCUMENTS

| | | | | |
|---|---|---|---|---|
| 7,865,211 | B2* | 1/2011 | Jabri | A61B 5/7475 455/556.1 |
| 8,150,323 | B2* | 4/2012 | Kim | H04M 1/6066 379/420.02 |
| 2008/0144645 | A1* | 6/2008 | Russell | H04L 47/10 370/412 |
| 2008/0205664 | A1* | 8/2008 | Kim | H04M 1/6066 381/77 |
| 2008/0300025 | A1* | 12/2008 | Song | H04M 1/6066 455/569.1 |
| 2008/3000025 | | 12/2008 | Jianming et al. | |
| 2009/0186668 | A1 | 7/2009 | Rahman et al. | |
| 2010/0273417 | A1* | 10/2010 | Tian | H04M 1/6066 455/41.2 |
| 2013/0130749 | A1 | 5/2013 | Andersen et al. | |

OTHER PUBLICATIONS

International Preliminary Report on Patentability for PCT/US2015/014280 dated Aug. 18, 2016 entitled "Smart Bluetooth Headset for Speech Command".

* cited by examiner

SMART BLUETOOTH HEADSET FOR SPEECH COMMAND

RELATED APPLICATION

This application claims the benefit of U.S. Provisional Application No. 61/935,141, filed on Feb. 3, 2014. The entire teachings of the above application are incorporated herein by reference.

BACKGROUND

A Bluetooth headset designed to pair with a cellphone, or other serving device, typically employs a Bluetooth Hands-Free Profile (HFP) or Bluetooth HeadSet Profile (HSP) to control how audio is passed from the cellphone to the headset. The HFP or HSP profile allows incoming audio data on the cellphone to be relayed directly to the headset for immediate playback via a near-ear speaker. Simultaneously, audio collected at the headset from one or more near-mouth microphones is passed immediately to the cellphone, which includes the collected audio in the current audio telephone call.

SUMMARY

Bluetooth headsets may offer some form of speech recognition to the user. Such speech recognition can be used to control features of the cellphone and to provide the user the ability to place calls just by speaking a command. However, to-date all Bluetooth headsets either run the speech recognition service directly on the Bluetooth headset itself, or use cloud-based recognition systems. A drawback of the former speech recognition service is the need for complex, expensive electronics in the headset. A drawback of the latter speech recognition service is the requirement of an always-on connection to the cloud.

In Bluetooth devices, speech recognition services have utilized the HFP or HSP for audio data transmission. The band for the HFP or HSP is 8 kHz, which is generally too narrow for proper speech recognition. To address this problem, a new Bluetooth HFP standard (v1.6), Wide-Band-Speech (WBS) with a 16 kHz sampling rate, has been used recently, together with compression method such as modified subband coding (mSBC).

Both HFP and HSP, which are designed for voice transmission, are lossy. (e.g., they sometimes lose voice packets or data). HFP and HSP typically do not re-transmit the lost voice packets at all, or re-transmit them at most once or twice to limit delay of the wireless phone call and continuation the wireless conversation. Losing a packet or two of speech data may be barely noticeable in the decoded speech output. Packet erasure concealment algorithms further reduce the speech degradation caused by missing speech packets. More important is reducing delay or lag in the cell phone conversation, so a lossy link is more acceptable than a high latency link for speech channels.

While it does not have a major impact on a cell phone call, the lost packet significantly degrades speech recognition. Bluetooth so far does not have a standard profile to address the problem of packet erasure when used for speech recognition purposes. The lossy protocol in voice channel has yet to be addressed in Bluetooth. In addition, HFP and HSP do not cancel enough non-stationary noises and can distort voice transmissions, which can degrade the accuracy of speech recognition.

In an embodiment of the present invention, a standard Bluetooth headset is improved to provide better speech recognition and deliver information to the user. In addition, the present invention substantially improves the voice recognition by addressing the loss of data packet problem in the Bluetooth.

In some embodiments, the Bluetooth device may be, rather than a headset, another type of wearable device. Such wearable devices may include a wrist-worn device, a device worn on the upper arm or other part of the body.

In one aspect, the invention may be a method of interfacing with a serving device from a wearable device worn by a user. The method may include establishing a lossless and wireless data link between the serving device and the wearable device, collecting, by the wearable device, audio data from one or more microphones of the wearable device. The method may further include sending, by the wearable device, the collected audio data to the serving device through the lossless and wireless data link.

In one embodiment, the wearable device is a headset device. In another embodiment, the wearable device is a wrist watch device.

One embodiment further includes providing, by the serving device, speech recognition services associated with the audio data.

In an embodiment, the speech recognition services include wide band speech processing and (iii) low-distortion speech compression.

Another embodiment further includes providing, by the wearable device, speech compression of the collected audio data.

In one embodiment, the serving device is one or more of a cellphone, a smartphone, a tablet device, a laptop computer, a notebook computer, a desktop computer, a network server, a wearable mobile communications device, a wearable mobile computer and a cloud-based computing entity.

Another embodiment further includes providing, by the wearable device, noise cancellation services associated with the collected audio data. Another embodiment further includes sending, from the wearable device to the serving device, information to establish, at the serving device, one or more components necessary to support the lossless and wireless data link.

In one embodiment, the one or more components necessary to support the lossless and wireless data link includes (i) one or more of a custom WIFI connection and a custom Bluetooth profile, (ii) a driver and (iii) compression/decompression code.

In another embodiment, the lossless and wireless data link is a Bluetooth link operating with a custom Bluetooth profile.

In another aspect, the invention may be a method of establishing a lossless and wireless data link between a serving device and a wearable device. The method may include establishing, by the wearable device, a wireless link of a first protocol between the wearable device and the serving device. The method may further include establishing, by the wearable device and using the wireless link of the first protocol, a lossless wireless link of a second protocol. The method may further include conveying to the serving device, by the wearable device, information to establish, at the serving device, one or more components necessary to support the lossless and wireless data link.

In one embodiment, the one or more components necessary to support the lossless and wireless data link includes a custom Bluetooth profile, a driver and compression/decompression code. In another embodiment, the wireless link of a first protocol is a lossy Bluetooth link, and the wireless link of a second protocol is a lossless Bluetooth link. In another embodiment, the lossless Bluetooth link is based on a Bluetooth SPP profile. In another embodiment, the lossless and wireless link of a first protocol is a Bluetooth link operating with a custom Bluetooth profile.

In another aspect, the invention may be a wearable device, including at least one microphone, at least one speaker, a voice compression engine, and a driver configured to transmit voice packets over a lossless, wireless data channel.

In one embodiment, the lossless, wireless data channel is based on a Bluetooth SPP profile. In another embodiment, the voice compression engine includes one or more of (i) Sub-Band-Coder, (ii) Speex, and (iii) ETSI Distributed Speech Recognition.

One embodiment may further include a noise cancellation engine. In another embodiment, the noise cancellation engine receives an audio signal from two or more sources, and uses linear noise cancellation algorithms to reduce ambient noise One embodiment may further include a code deployment module configured to convey a custom Bluetooth profile and driver to a serving device, to facilitate implementation of the lossless link at the serving device. In another embodiment, the code deployment module conveys a applet to the serving device to install the custom Bluetooth profile and driver on the serving device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
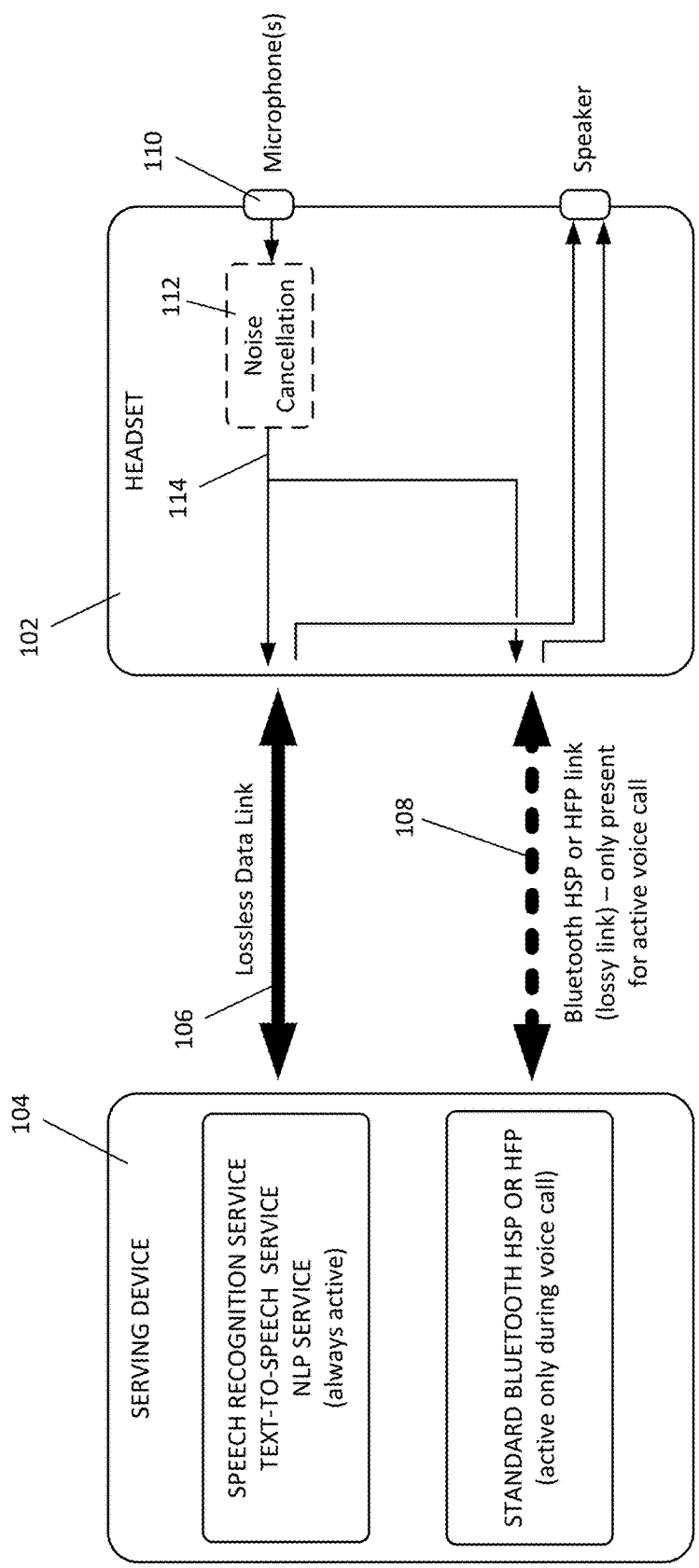
FIG. 1 is a block diagram illustrating an example embodiment of connecting a headset with a cellphone using two audio links.

FIG. 1, described in more detail below, is an example embodiment of the invention. This embodiment concerns two primary components—a headset 102 and a serving device 104, connected by one or more wireless links. The serving device 104 may be any device that could implement a wireless link to a hands-free headset, including but not limited to a cellphone, a smartphone, a tablet device, a laptop computer, a notebook computer, a desktop computer, a network server, a wearable mobile communications device, a wearable mobile computer or a cloud-based entity. The wearable device may include a device worn on the user's wrist, upper arm, leg, waist or neck, or any other body part suitable for supporting a communications and/or computing device. Similarly the headset 102 component may be, rather than a headset, a device worn on the user's wrist, upper arm, leg, waist or neck, or any other body part suitable for supporting wireless device (e.g., Bluetooth or WiFi device).

In embodiments of the present invention, the serving device directly hosts a speech recognition service. To facilitate this hosting, the embodiments establish a new, secondary data link from the serving device to the headset. The secondary data link should be lossless. The secondary data link may be a Bluetooth data link. The secondary Bluetooth data link may be used to send the near-mouth microphone input (or a second copy of the microphone input, if the HFP link is active) to the serving device, which is running a speech recognition service/speech recognition processing software. The secondary Bluetooth data link preserves the original Hands-free Profile link and ensures ongoing compatibility with the cellphone's existing firmware. In taking this approach, compression schemes can compress the audio data between serving device and headset in ways not supported by standard Hands-Free profiles (e.g., by using compression/decompression schemes that require a lossless data path).

With this system setup, the user can speak a command to the headset. The command (e.g., the spoken audio) is immediately conveyed to the serving device via the secondary Bluetooth data link, whereupon the audio is passed into a speech recognition system. Depending on the commands spoken, the speech recognizer is then able to take appropriate action, such as initiating a new call to a given phone number.

Furthermore, with this system in place, functionality is no longer confined to just establishing telephone calls. Natural sentences can be spoken by the headset wearer to action other important functions, such as "send SMS message to John that I shall be late tonight". This sentence, when processed by speech recognition and natural language/natural language understanding engines on the serving device or on a network server through the wireless link can be used to create and send appropriate SMS messages, for example. In the same way, the user can query the state of the phone or perform web-based queries by speaking to the headset and letting the serving device perform speech recognition and execute an action appropriate to the recognized speech.

At the same time as using the secondary Bluetooth data link to collect microphone data and send to the serving device, the link can also send audio from the serving device back to the headset for playback via the near-ear speaker. In particular, this is used to convey information back to the headset wearer via computer generated spoken phrases, aka Text-to-Speech (TTS).

For example, software running on the serving device can detect an incoming SMS text message. Typically a serving device alerts the user with a chime and can display the incoming message on the screen. In an embodiment of the present invention, the SMS message can be converted to speech (e.g., text-to-speech) one the server side, and the speech audio of the reading can be sent over the Bluetooth link for playback to the user. The result here is a system that reads aloud incoming messages to the user without the user having to operate or look at the serving device.

This technique can be combined with the speech recognition service to provide a two-way question and answer system. For example, the user can now speak to the headset to ask a question such as "what time is it?" This audio can be processed by the speech recognition service, an answer calculated, and then spoken aloud to the user.

FIG. 1 is a block diagram illustrating an example embodiment of connecting a headset 102 with a serving device 104 using two bi-directional channels; a lossless data link 106 and a lossy data link 108. In this example embodiment, the lossless data link 106 is a Bluetooth link using Serial Port Profile (SPP), and the lossy data link 108 is a Bluetooth link using the headset profile (HSP) or the hands free profile (HFP). In other embodiments, the lossless data link 106 may be another digital data link such as WiFi or other wireless technologies known in the art.

As will be described in more detail below, while SPP may provide an underlying basis for a lossless data link, the profile itself does not provide lossless transmission. As of this time, Bluetooth does not provide a standard profile to address the problem of packet loss, in particular when used for speech recognition purposes. A customized profile is required, or at the very least a modified version of the SPP is required.

In this example, the lossless data link 106 is established and allowed to remain active as long as both the serving device 104 and the headset 102 are active (i.e., turned on). The lossy data link 108, on the other hand, is active only when the user of the headset 102 is making a voice call.

In this example embodiment, one or more microphones 110 on the headset 102 collect audio data. Audio can then, optionally, be passed through a noise cancellation module 112 on the headset 102 to reduce background noise and improve speech recognition. The use of multiple microphones 110 may further improve the overall noise cancellation performance by more effectively canceling both stationary and non-stationary noises.

The microphone audio 114 may then be split into two streams, as shown. One of the audio streams is sent to the lossless data link 106 and one to the lossy data link 108.

As described earlier, the lossy data link 108 is only established between headset 102 and serving device 104 as associated with an active telephone call. Thus, this communication link is intermittent. When the lossy data link 108 is established, one of the audio streams is sent to the serving device 104 as part of normal, hands-free system. Audio is sent from serving device 104 to headset 102 over the lossless data link 106. Audio may also be sent from the serving device 104 to the headset 102 over the lossy (HFP or HSP) data link 108, in the event that the serving device operation requires a call to occur over the HFP or HSP data link 108. In some embodiments, the audio may be in the form of computer generated spoken phrases (e.g., Text-To-Speech service), which are played back on headset.

If a Bluetooth Hands-free call is active, the audio is also played back on the headset 102 and merged with any spoken phrases from the lossless data link 106 (also referred to herein as command/control link). The audio received through the lossless data link 106 may be given priority by temporarily muting the telephone call speech from the lossy data link 108, or the two audio signals may be mixed so the user hears both simultaneously, or the audio from the lossy data link 108 may be temporarily attenuated (i.e., partially muted), to make it easier to hear the audio from the lossless data link 106.

Figure 2:
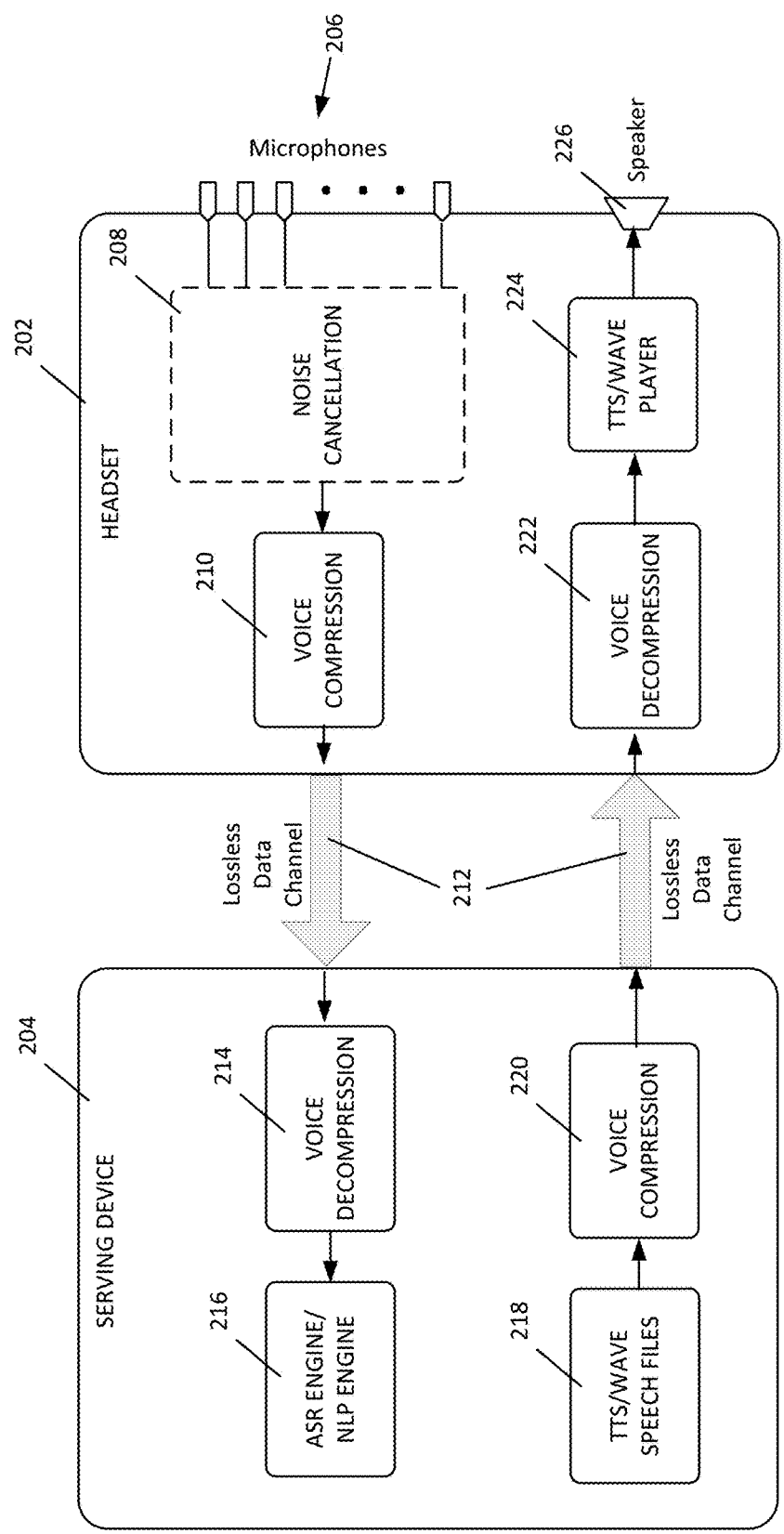
FIG. 2 is a block diagram illustrating an example embodiment of processing and transmitting of audio signal for speech recognition according to the invention.
Figure 3:
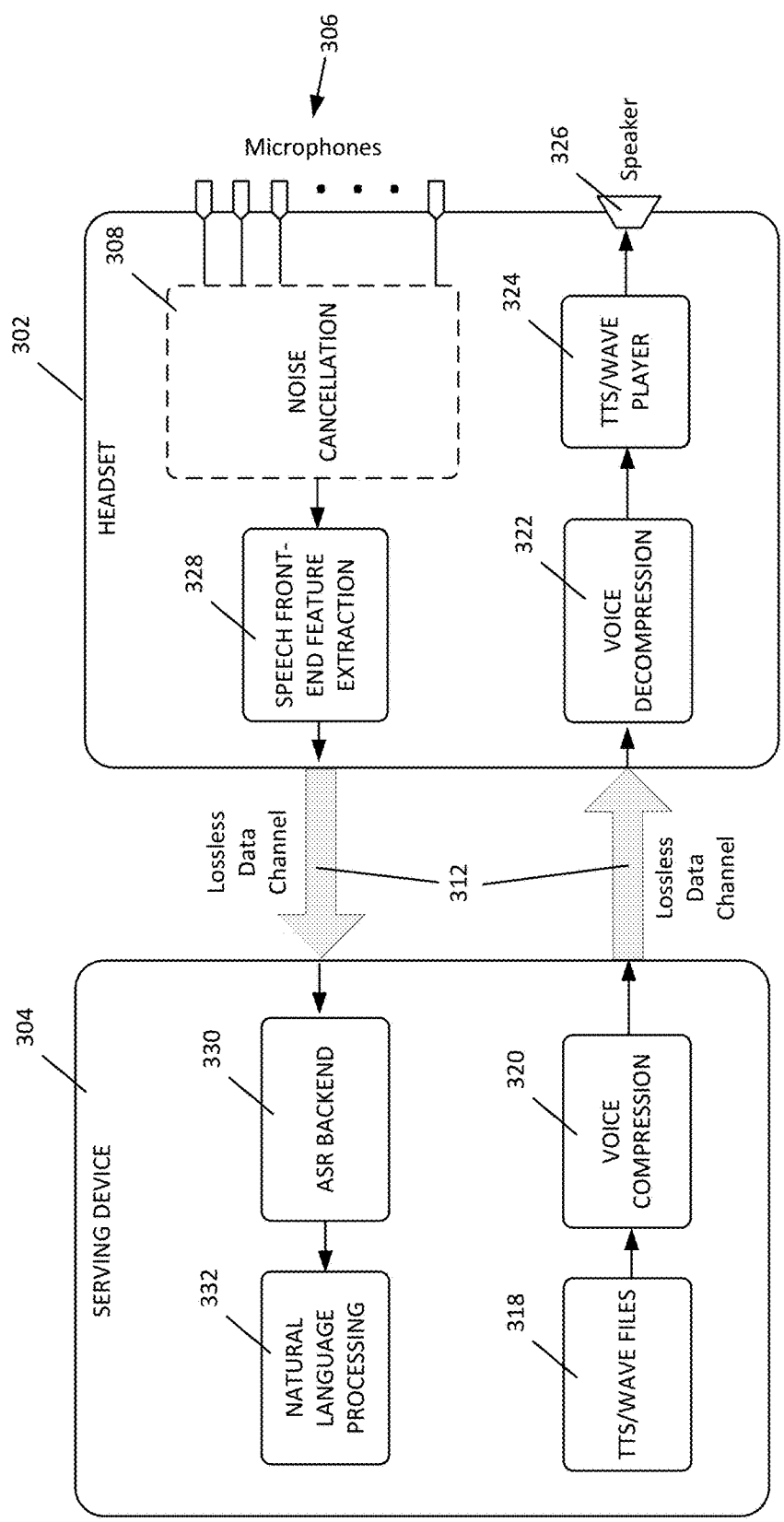
FIG. 3 is a block diagram illustrating another example embodiment of processing and transmitting of audio signal for speech recognition according to the invention.

FIG. 2 and FIG. 3 are block diagrams illustrating example embodiments of processing and transmission of audio speech signal for speech recognition. In this example embodiment, audio information is conveyed between a headset 202 and a serving device 204 across a bidirectional, lossless, wireless data link.

In the example embodiment shown in FIG. 2, the audio speech signal is collected from two or more microphones 206, and processed by a noise cancellation module 208. In one embodiment, noise cancellation may be processed using linear algorithms to avoid introducing any non-linear distortion to the speech signal. FIG. 2 illustrates compression of the speech signal with a voice compression module 210. The compressed speech signal is sent to the serving device 204 across a lossless, bidirectional, wireless data link 212, for example a Serial Port Profile (SPP) Bluetooth data link.

The serving device 204 receives the compressed speech signal from the lossless data link 212 and decompresses the compressed speech data using a voice decompression module 214. The resulting voice data, acquired through a lossless data path, can be used by an Automatic Speech Recognition (ASR) engine and/or a Natural Language Processing engine 216.

The serving device 204 may have digital speech files (e.g., Text-To-Speech (TTS) or WAVE (.wav format)) to send to the headset 202. The speech data is first compressed by a voice compression module, and send to the headset through the lossless data link 212. A voice decompression module 222 decompresses the speech data and provides the data to a TTS or WAVE play module 224, which converts the audio file to an audio signal that drives a speaker 226.

FIG. 3 illustrates an embodiment that provides front-end feature extraction and noise cancellation in the headset 302, with an ASR backend and a natural language processing (NLP) engine in the serving device. As with the embodiment of FIG. 2, audio is collected with two or more microphones 306, a noise cancelation module 308 reduces ambient noise. Data passes between the headset 302 and the serving device 304 over a lossless data link 312, to an ASR backend module 330 at the serving device 304. The ASR backend module 330 provides the processed speech data to an NLP engine. As with the embodiment shown in FIG. 2, TTS/WAVE files 318 may be transferred from the serving device 304 to the headset 302 through a voice compression module 320, the lossless data link 312, a voice decompression module 322 and a TTS or WAVE player driving a speaker 326. In other embodiments, WAVE files may be stored on the headset, and initiated for playback on the headset by a simple command conveyed by the serving device.

The features highlighted by FIG. 2 and FIG. 3 are examples of how the described embodiments may be provide useful functionality. These embodiments may be combined with each other, or with other embodiments that provide other features.

The following are examples of voice compression techniques that may be employed for speech recognition in the described embodiments:

Sub-Band-Coder (SBC)
Bluetooth WBS mSBC
Speex (or other Code Excited Linear Prediction (CELP) based compression algorithms)
Opus
European Telecommunications Standards Institute (ETSI) Distributed Speech Recognition (DSR)

As described above, the Bluetooth Serial Port Profile (SPP) does not by itself provide lossless transmission. The described embodiments, however, when used in conjunction with Bluetooth SPP, do create a lossless data link. The described embodiments implement at least a custom Bluetooth profile and driver to implement the operations necessary for a lossless link. Such operations may include retransmission protocols such as Automatic Repeat reQuest ARQ, Hybrid ARQ (HARQ), and other lost packet recovery techniques known in the art. Some embodiments include custom software in both ends of the Bluetooth link. The software may include custom Bluetooth profile(s), driver(s) and compression/decompression codes.

Some embodiments modify the Bluetooth SPP to provide a lossless data link, while other embodiments provide a completely custom Bluetooth profile to provide a lossless data link suitable for ASR. It should also be noted that while the example embodiments utilize Bluetooth to provide a wireless link, the described embodiments may utilize other wireless protocols and interfaces to provide the described benefits.

The described embodiments may also provide techniques for installing the aforementioned custom software and codes at the serving device side. In some embodiments, the serving device side may include a pre-installed custom driver. In other embodiments, the Bluetooth Hands-free device can download an applet (or other vehicle for conveying the necessary drivers and software) to the serving device through Bluetooth SPP link described above, once that Bluetooth link is established.

The described embodiments can easily be extended to accommodate a display on the Bluetooth headset. In such an extension, the information required for display on the headset can be sent from the cellphone to the headset using the always-on command and control link. Information can be sent and rendered by the headset. Alternatively, information can be rendered by the cellphone and sent as an image or partial image to the headset for display. This latter method allows for the headset firmware to be simple and flexible—all of the hard work is done by the cellphone.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a controller or processor. The computer-executable instructions may include instructions that implement one or more embodiments of the invention. The tangible computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of interfacing with a serving device from a wearable device worn by a user, the method comprising:
    establishing a lossless and wireless data link between the serving device and the wearable device;
    collecting, by the wearable device, audio data from one or more microphones of the wearable device; and
    sending, by the wearable device, the collected audio data to the serving device through the lossless and wireless data link;
    sending, from the wearable device to the serving device, information to establish, at the serving device, one or more components necessary to support the lossless and wireless data link, the one or more components necessary to support the lossless and wireless data link comprises (i) one or more of a custom WIFI connection and a custom Bluetooth profile, (ii) a driver and (iii) compression/decompression code.

2. The method of claim 1, wherein the wearable device is a headset device.

3. The method of claim 1, wherein the wearable device is a wrist watch device.

4. The method of claim 1, further including providing, by the serving device, speech recognition services associated with the audio data.

5. The method of claim 4, wherein the speech recognition services include wide band speech processing and (iii) low-distortion speech compression.

6. The method of claim 1, further including providing, by the wearable device, speech compression of the collected audio data.

7. The method of claim 1, wherein the serving device is one or more of a cellphone, a smartphone, a tablet device, a laptop computer, a notebook computer, a desktop computer, a network server, a wearable mobile communications device, a wearable mobile computer and a cloud-based computing entity.

8. The method of claim 1, further including providing, by the wearable device, noise cancellation services associated with the collected audio data.

9. The method of claim 1, wherein the lossless and wireless data link is a Bluetooth link operating with a custom Bluetooth profile.

10. A method of establishing a lossless and wireless data link between a serving device and a wearable device, comprising:
    establishing, by the wearable device, a wireless link of a first protocol between the wearable device and the serving device;
    establishing, by the wearable device and using the wireless link of the first protocol, a lossless wireless link of a second protocol;
    conveying to the serving device, by the wearable device, information to establish, at the serving device, one or more components necessary to support the lossless and wireless data link, the one or more components necessary to support the lossless and wireless data link comprises a custom Bluetooth profile, a driver and compression/decompression code.

11. The method of claim 10, wherein the wireless link of a first protocol is a lossy Bluetooth link, and the wireless link of a second protocol is a lossless Bluetooth link.

12. The method of claim 11, wherein the lossless Bluetooth link is based on a Bluetooth SPP profile.

13. The method of claim 10, wherein the lossless and wireless link of a first protocol is a Bluetooth link operating with a custom Bluetooth profile.

14. A wearable device, comprising:
    at least one microphone;
    at least one speaker;
    a voice compression engine;
    a driver configured to transmit voice packets over a lossless, wireless data channel; and
    a code deployment module configured to convey a custom Bluetooth profile and driver to a serving device, to facilitate implementation of the lossless link at the serving device.

15. The wearable device of claim 14, wherein the lossless, wireless data channel is based on a Bluetooth SPP profile.

16. The wearable device of claim 14, wherein the voice compression engine includes one or more of (i) Sub-Band-Coder, (ii) Speex, and (iii) ETSI Distributed Speech Recognition.

17. The headset of claim 14, further including a noise cancellation engine.

18. The headset of claim 17, wherein the noise cancellation engine receives an audio signal from two or more sources, and uses linear noise cancellation algorithms to reduce ambient noise.

19. The headset of claim 14, wherein the code deployment module conveys a applet to the serving device to install the custom Bluetooth profile and driver on the serving device.

* * * * *